US012687484B2

(12) United States Patent
　　　Furukawa

(10) Patent No.: US 12,687,484 B2
(45) Date of Patent: Jul. 21, 2026

(54) BIOLOGICAL SAMPLE ANALYSIS SYSTEM, INFORMATION PROCESSOR, INFORMATION PROCESSING METHOD, AND BIOLOGICAL SAMPLE ANALYSIS METHOD

(71) Applicant: Sony Group Corporation, Tokyo (JP)

(72) Inventor: Akio Furukawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 250 days.

(21) Appl. No.: 18/572,939

(22) PCT Filed: Mar. 11, 2022

(86) PCT No.: PCT/JP2022/011123
　　　§ 371 (c)(1),
　　　(2) Date: Dec. 21, 2023

(87) PCT Pub. No.: WO2023/276298
　　　PCT Pub. Date: Jan. 5, 2023

(65) Prior Publication Data
　　　US 2024/0295488 A1　　Sep. 5, 2024

(30) Foreign Application Priority Data
　　　Jul. 1, 2021　(JP) ................................. 2021-110227

(51) Int. Cl.
　　　*G01N 15/14*　　　(2024.01)
　　　*G01N 15/1434*　　(2024.01)
　　　*G06T 7/00*　　　(2017.01)
(52) U.S. Cl.
　　　CPC ......... *G01N 15/147* (2013.01); *G06T 7/0016* (2013.01); *G01N 2015/144* (2013.01)

(58) Field of Classification Search
　　　CPC ........... G01N 15/147; G01N 2015/144; G01N 15/1433; G01N 2015/1006; G06T 7/0016; H04N 25/768; H04N 25/773
　　　(Continued)

(56) References Cited

U.S. PATENT DOCUMENTS 6,211,955 B1　　4/2001　Basiji et al.
2004/0021868 A1*　2/2004　Ortyn ................. G01N 21/6456
　　　　　　　　　　　　　　　　　　356/419

(Continued)

FOREIGN PATENT DOCUMENTS

CN　　　112019777 A　　12/2020
JP　　2013-210229 A1　10/2013
(Continued)

OTHER PUBLICATIONS

International Search Report and English translation thereof mailed Apr. 12, 2022 in connection with International Application No. PCT/JP2022/011123.

(Continued)

*Primary Examiner* — Md M Rahman
(74) *Attorney, Agent, or Firm* — Wolf, Greenfield & Sacks, P.C.

(57) ABSTRACT

A biological sample analysis system according to an embodiment of the present disclosure includes an irradiator, a plurality of pixels disposed in a matrix form, and a generator. The irradiator irradiates a biological particle in a biological sample with light. Each of the plurality of pixels generates a pulse signal in response to incidence of light emitted from the biological particle as a result of irradiation with the light. The generator generates image data by performing a TDI process with use of a plurality of pulse signals obtained from a plurality of sets of pixel lines of the (Continued)

plurality of pixels, the plurality of sets of pixel lines being disposed to be aligned in a row direction.

13 Claims, 6 Drawing Sheets

(58) Field of Classification Search
USPC .......................................................... 356/432
See application file for complete search history.

(56) References Cited

U.S. PATENT DOCUMENTS

| | | | |
|---|---|---|---|
| 2013/0248689 A1 | 9/2013 | Eldesouki | |
| 2013/0258093 A1 | 10/2013 | Jingu | |
| 2014/0065637 A1* | 3/2014 | Kirk | G01N 15/1433 |
| | | | 435/7.1 |
| 2015/0260659 A1 | 9/2015 | Chuang et al. | |
| 2018/0284009 A1 | 10/2018 | Kaduchak et al. | |
| 2023/0239587 A1* | 7/2023 | Nakamura | H04N 25/701 |
| | | | 348/46 |
| 2023/0288312 A1* | 9/2023 | You | G01N 15/147 |

FOREIGN PATENT DOCUMENTS

| | | | | |
|---|---|---|---|---|
| JP | 2017-512990 A1 | 5/2017 | | |
| JP | 2020-513103 A1 | 4/2020 | | |
| JP | 2021-022792 A1 | 2/2021 | | |
| KR | 20150018469 A | * 2/2015 | .............. | H01J 37/20 |
| WO | WO-2005008221 A1 | * 1/2005 | ............. | B01D 57/02 |
| WO | WO-2020262092 A1 | * 12/2020 | ............. | H04N 23/56 |

OTHER PUBLICATIONS

International Written Opinion and English translation thereof mailed Apr. 12, 2022 in connection with International Application No. PCT/JP2022/011123.

International Preliminary Report on Patentability and English translation thereof mailed Jan. 11, 2024 in connection with International Application No. PCT/JP2022/011123.

Extended European Search Report issued Oct. 16, 2024 in connection with European Application No. 2832462.0.

* cited by examiner

[ FIG. 1 ]
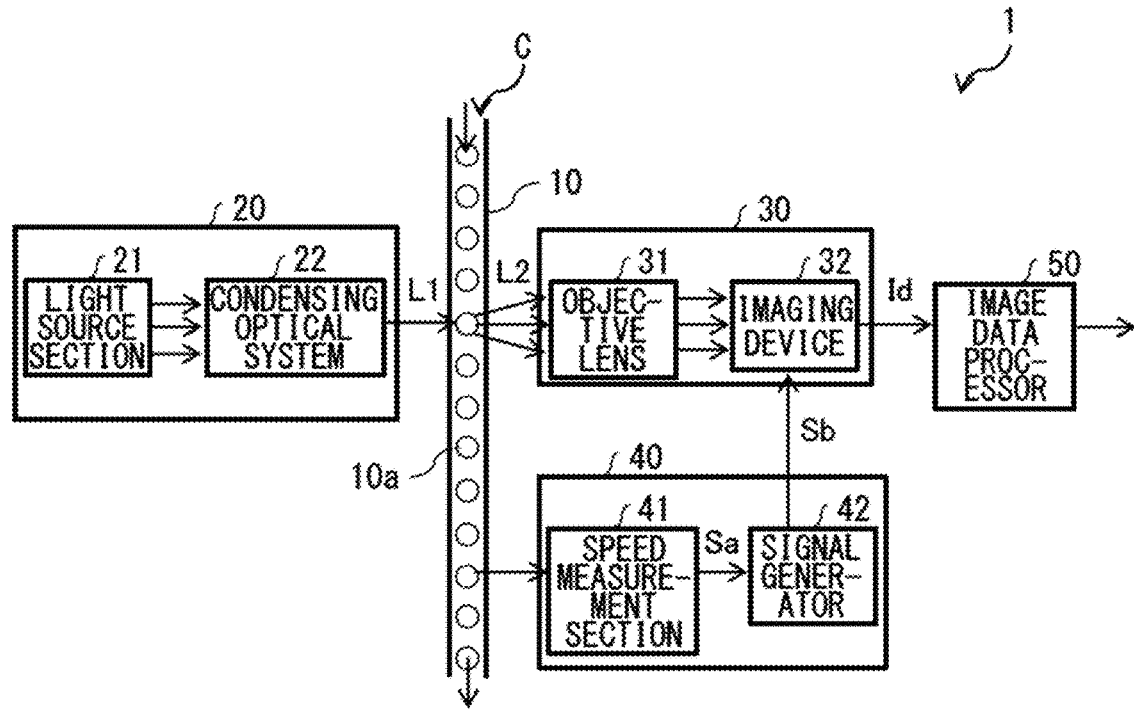
[ FIG. 2 ]
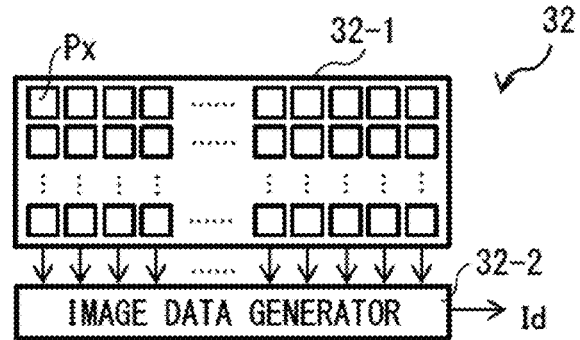

[ FIG. 3 ]
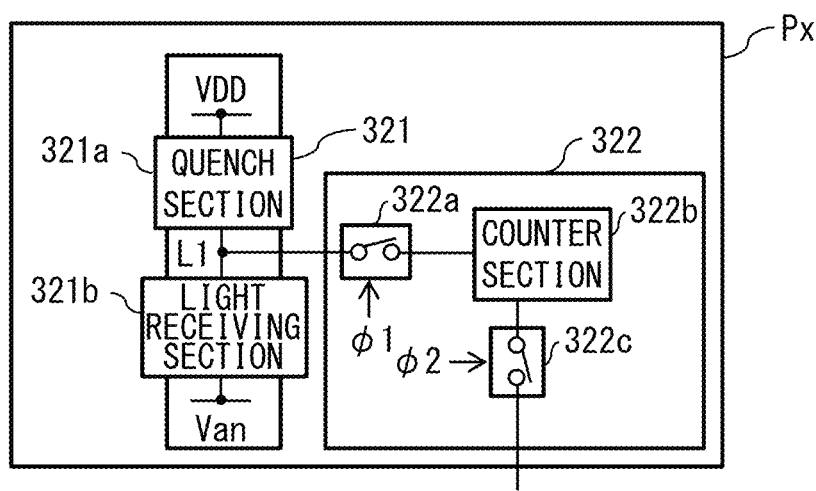
[ FIG. 4 ]
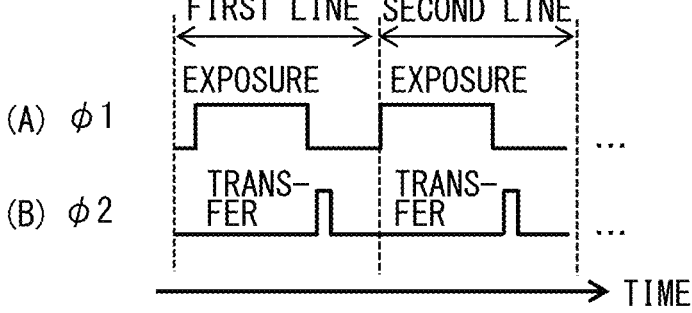

[ FIG. 5 ]
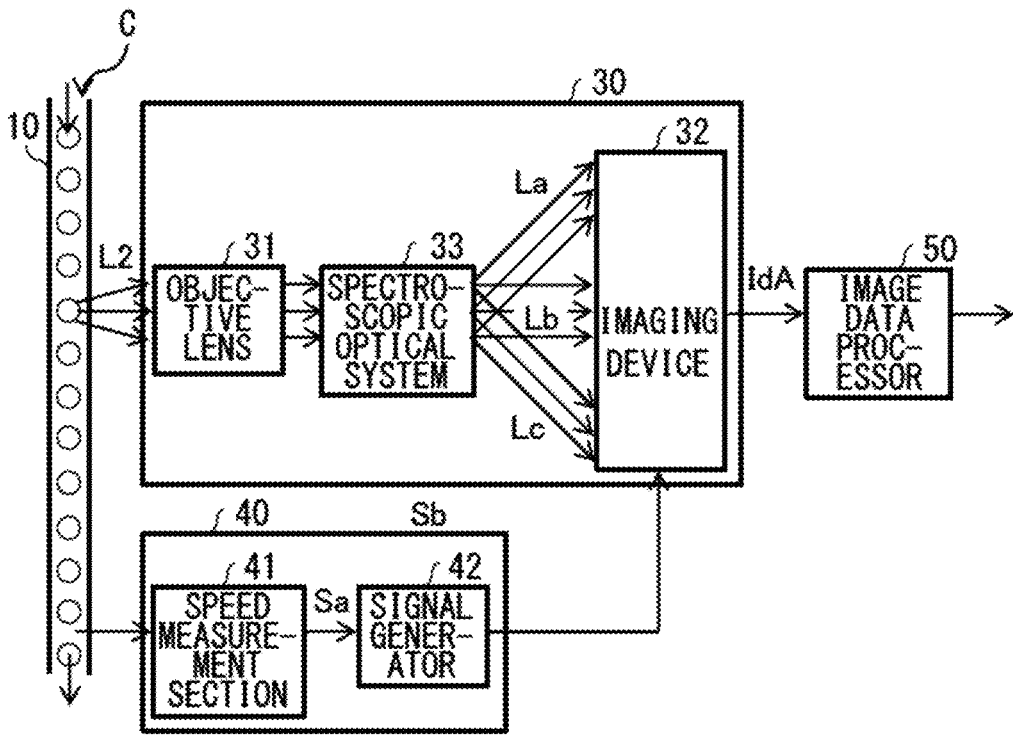
[ FIG. 6 ]
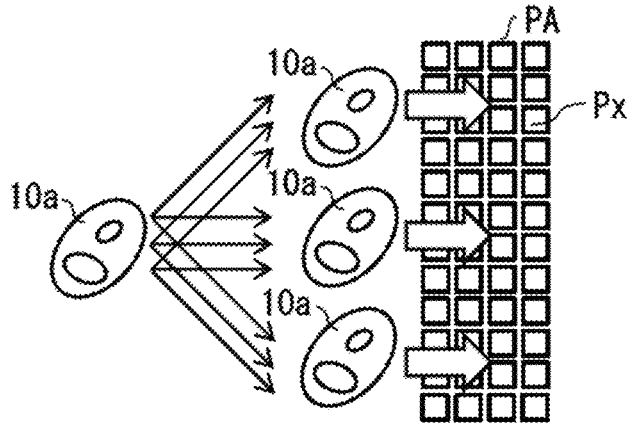

[ FIG. 7 ]
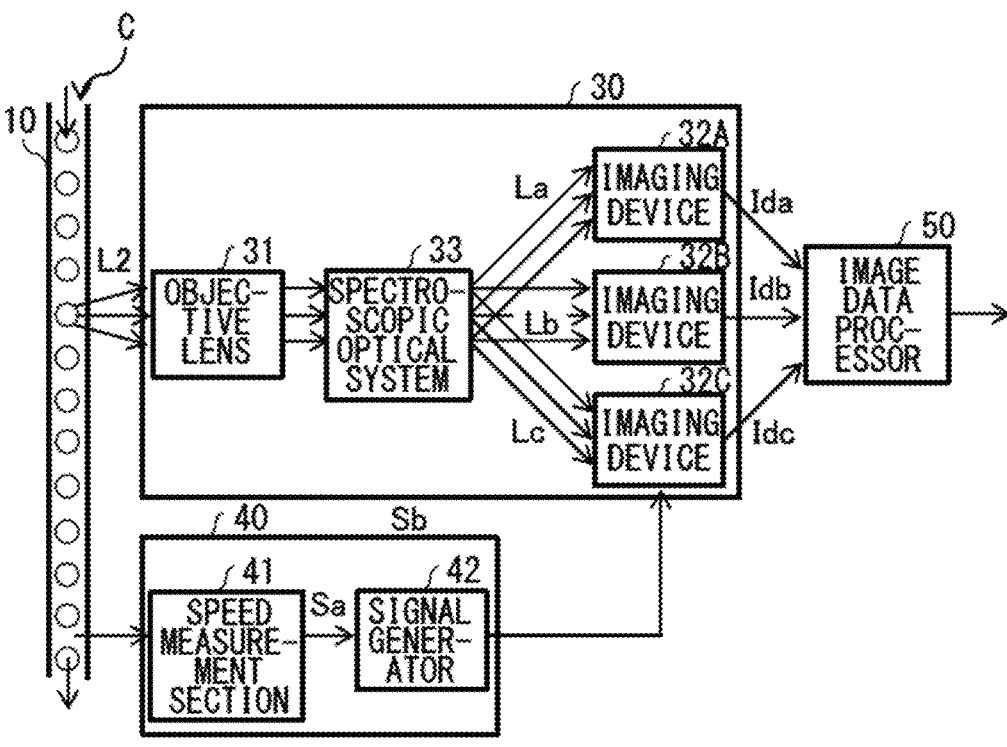
[ FIG. 8 ]
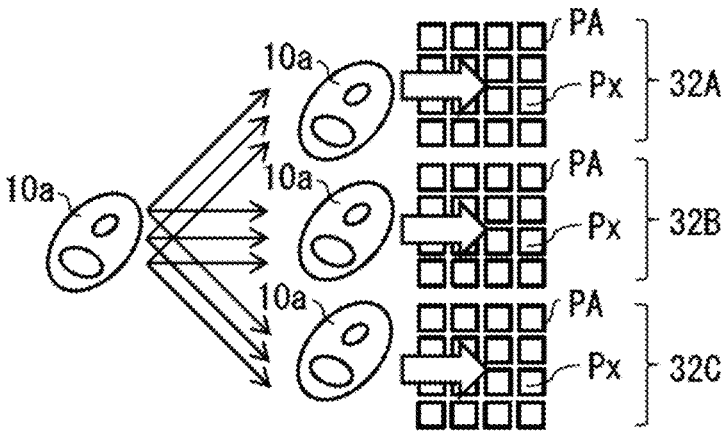

[ FIG. 9 ]
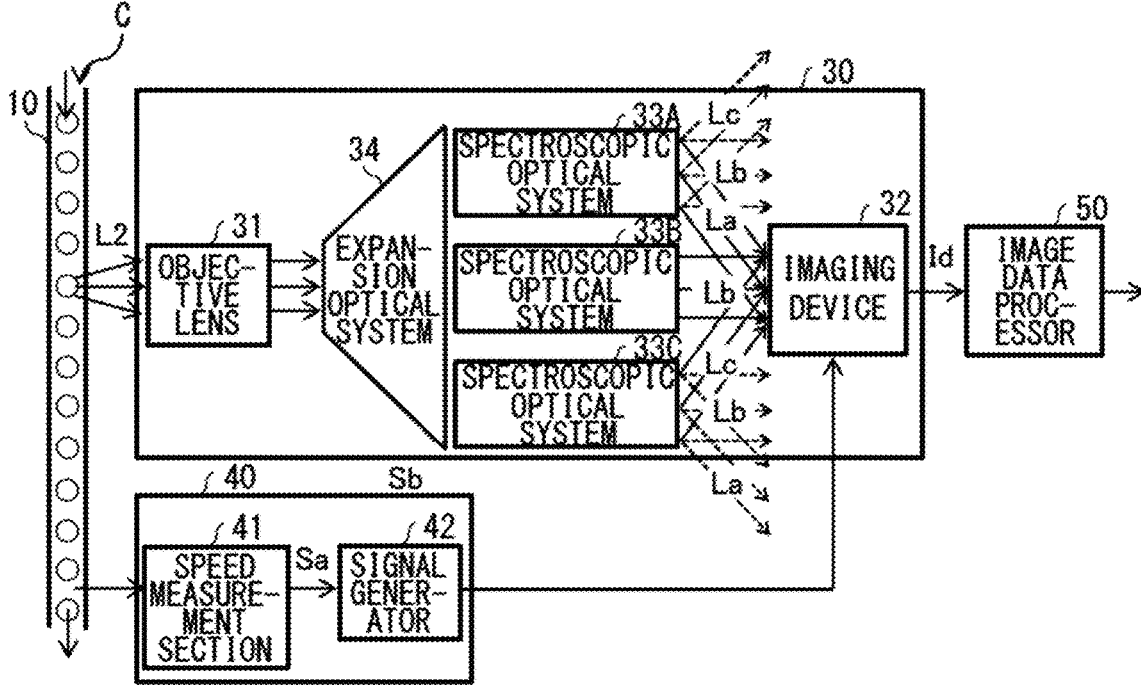
[ FIG. 10 ]
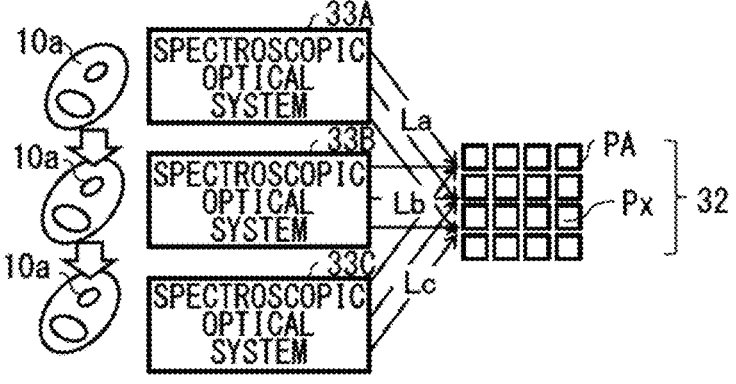

[ FIG. 11 ]
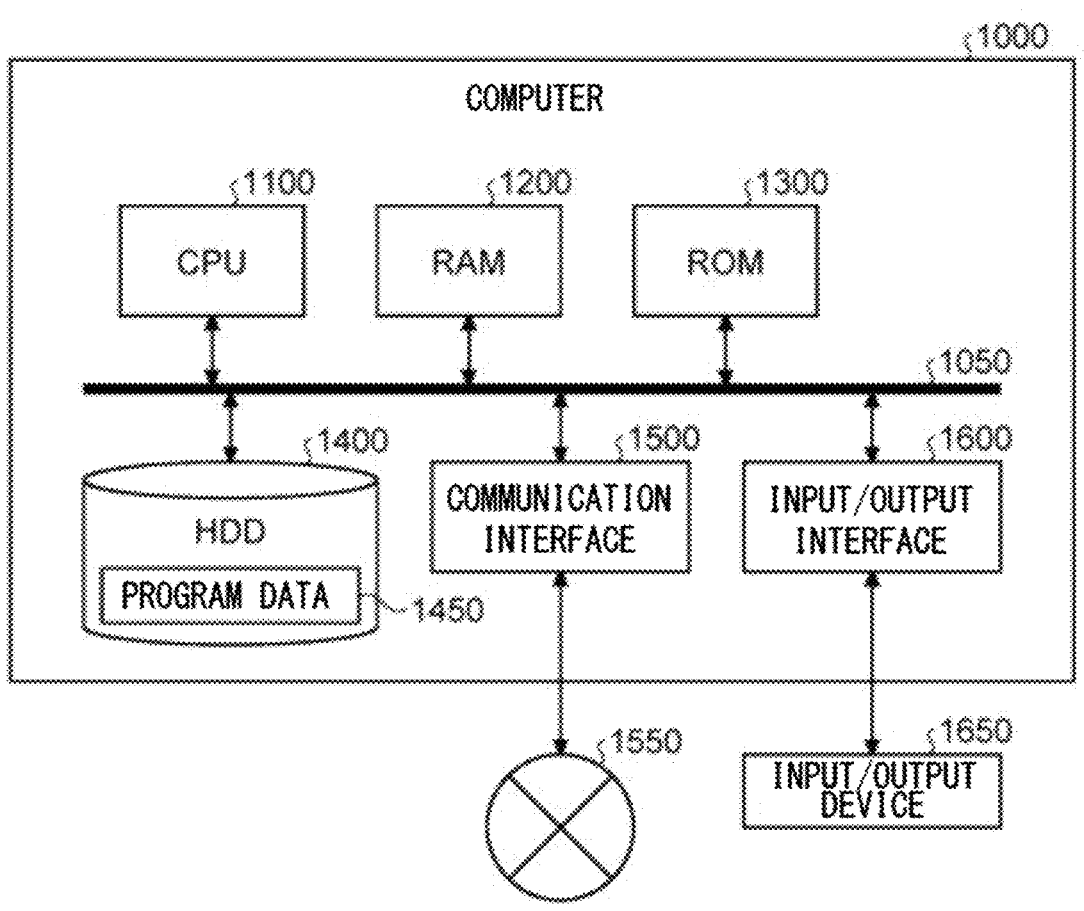

BIOLOGICAL SAMPLE ANALYSIS SYSTEM, INFORMATION PROCESSOR, INFORMATION PROCESSING METHOD, AND BIOLOGICAL SAMPLE ANALYSIS METHOD

CROSS-REFERENCE TO RELATED APPLICATIONS

This application claims the benefit under 35 U.S.C. § 371 as a U.S. National Stage Entry of International Application No. PCT/JP2022/011123, filed in the Japanese Patent Office as a Receiving Office on Mar. 11, 2022, which claims priority to Japanese Patent Application Number JP2021-110227, filed in the Japanese Patent Office on Jul. 1, 2021, each of which is hereby incorporated by reference in its entirety.

TECHNICAL FIELD

The present disclosure relates to a biological sample analysis system, an information processor, an information processing method, and a biological sample analysis method.

BACKGROUND ART

Existing methods for performing analysis (or analytics. In the present disclosure, analysis shall include analytics.) on proteins of biological microparticles, such as cells, microorganisms, liposomes, or the like include flow cytometry (Flow Cytometry). An apparatus used in the flow cytometry is referred to as a flow cytometer (Flow Cytometer: FCM). With the flow cytometer, microparticles flowing in line in a flow channel are irradiated with laser light of a predetermined wavelength, and light emitted from each of the microparticles, such as fluorescence, forward scattered light, or side scattered light, is converted into an electric signal and subjected to quantification by means of a photodetector, of which results are statistically analyzed to thereby determine a kind, a size, a structure, etc. of the individual microparticles.

Further, in recent years, what is called an imaging flow cytometer (Imaging Flow Cytometer: IFCM) has been developed that acquires a two-dimensional image of fluorescence emitted from the microparticles by means of an image sensor.

CITATION LIST

Patent Literature

Patent Literature 1: U.S. Pat. No. 6,211,955

SUMMARY OF THE INVENTION

However, the fluorescence emitted from the microparticles is very weak, and this makes it difficult for an existing imaging flow cytometer to acquire a clear image with sufficient brightness, thus making it difficult to increase accuracy of analysis of the microparticles.

Further, in recent years, an imaging flow cytometer based on what is called a time delay integration (Time Delay Integration: TDI)-CCD method has been developed that transfers an exposure value of a CCD to an adjacent line in synchronization with a speed of cells and performs integration (for example, see Patent Literature 1). However, according to this method, a speed at which the amounts of received light at respective lines are sequentially added together (hereinafter referred to as a "line rate") is restricted by an AD (Analog-to-Digital) conversion time or a correlated double sampling (Correlated Double Sampling: CDS) process time, and an upper limit of the line rate is thus limited to about several 100 kHz. Accordingly, in the TDI-CCD method, it is necessary to reduce the speed of the cells flowing in the flow channel, which leads to a limitation to the number of samples observable per unit time. This results in prolongation of analysis time. It is therefore desirable to provide a biological sample analysis system, an information processor, an information processing method, and a biological sample analysis method that each make it possible to improve analysis accuracy while suppressing prolongation of the analysis time.

A biological sample analysis system according to an embodiment of the present disclosure includes an irradiator, a plurality of pixels disposed in a matrix form, and a generator. The irradiator irradiates a biological particle in a biological sample with light. Each of the pixels generates a pulse signal in response to incidence of light emitted from the biological particle as a result of irradiation with the light. The processor generates image data by performing a TDI process with use of a plurality of pulse signals obtained from a plurality of sets of pixel lines of the plurality of pixels, the plurality of sets of pixel lines being disposed to be aligned in a row direction.

An information processor according to an embodiment of the present disclosure includes a generator. The generator generates image data by performing a TDI process with use of a plurality of pulse signals obtained from a plurality of sets of pixel lines of a plurality of pixels disposed in a matrix form, the plurality of sets of pixel lines being disposed to be aligned in a row direction. Each of the pixels generates the pulse signal in response to incidence of light emitted from a biological particle in a biological sample as a result of irradiation of the biological particle with light.

An information processing method according to an embodiment of the present disclosure includes generating image data by performing a TDI process with use of a plurality of pulse signals obtained from a plurality of sets of pixel lines of a plurality of pixels disposed in a matrix form, the plurality of sets of pixel lines being disposed to be aligned in a row direction. Each of the pixels generates the pulse signal in response to incidence of light emitted from a biological particle in a biological sample as a result of irradiation of the biological particle with light.

An information processing method according to an embodiment of the present disclosure includes the following two:

(A) irradiating a biological particle in a biological sample with light; and (B) generating image data by performing a TDI process with use of a plurality of pulse signals obtained from a plurality of sets of pixel lines of a plurality of pixels disposed in a matrix form, the plurality of sets of pixel lines being disposed to be aligned in a row direction, each of the plurality of pixels generating the pulse signal in response to incidence of light emitted from the biological particle as a result of irradiation with the light.

According to the biological sample analysis system, the information processor, the information processing method, and the biological sample analysis method, when light emitted from a biological particle in a biological sample as a result of irradiation of the biological particle with light is incident on a plurality of pixels disposed in a matrix form, a pulse signal corresponding to the incidence is generated. It is thus possible to obtain a digital signal corresponding to the incidence of light without using an AD converter. Further, according to the present disclosure, the TDI process is performed with use of a plurality of pulse signals obtained from a plurality of sets of pixel lines of the plurality of pixels, the plurality of sets of pixel lines being disposed to be aligned in the row direction. In this way, according to the present disclosure, it is possible to perform the TDI process without performing any AD conversion process. Further, image data obtained in such a manner is low-noise data, and therefore it is not necessary to perform any CDS process.

BRIEF DESCRIPTION OF DRAWINGS

FIG. 1 is a diagram illustrating an example of functional blocks of a flow cytometer according to one embodiment of the present disclosure.

FIG. 2 is a diagram illustrating a schematic configuration example of an imaging device of FIG. 1.

FIG. 3 is a diagram illustrating a circuit configuration example of a pixel of FIG. 2.

FIG. 4 is a timing chart illustrating an example of a method of controlling the imaging device of FIG. 3.

FIG. 5 is a diagram illustrating a modification example of the functional blocks of the flow cytometer of FIG. 1.

FIG. 6 is a diagram conceptually illustrating how imaging is performed by the flow cytometer of FIG. 5.

FIG. 7 is a diagram illustrating a modification example of the functional blocks of the flow cytometer of FIG. 1.

FIG. 8 is a diagram conceptually illustrating how imaging is performed by the flow cytometer of FIG. 7.

FIG. 9 is a diagram illustrating a modification example of the functional blocks of the flow cytometer of FIG. 1.

FIG. 10 is a diagram conceptually illustrating how imaging is performed by the flow cytometer of FIG. 9.

FIG. 11 is a hardware configuration diagram illustrating an example of a computer that implements a function of an image data processor of FIG. 1.

MODES FOR CARRYING OUT THE
INVENTION

In the following, some embodiments of the present disclosure are described in detail with reference to the drawings. It is to be noted that description is given in the following order.
1. Embodiment (FIGS. 1 to 4)
2. Modification Examples (FIGS. 5 to 11)

1. Embodiment

[Configuration]
FIG. 1 illustrates an example of functional blocks of a flow cytometer 1 according to an embodiment of the present disclosure. FIG. 2 illustrates a schematic configuration example of an imaging device 32 in the flow cytometer 1. The flow cytometer 1 corresponds to a specific example of each of a "biological sample analysis system" and an "information processor" of the present disclosure. Further, information processing executed by the flow cytometer 1 corresponds to a specific example of each of an "information processing method" and a "biological sample analysis method" of the present disclosure.
The flow cytometer 1 causes a biological sample C including large quantities of biological particles (cells 10a)

to flow through a narrow flow channel (e.g., a flow channel 10), and thereby causes the large quantities of biological particles (e.g., the cells 10a) to line up and flow in the flow channel (e.g., the flow channel 10). The flow cytometer 1 irradiates the biological particles (e.g., the cells 10a) flowing through the flow channel (e.g., the flow channel 10) with light. The flow cytometer 1 includes a plurality of pixels Px that each generates a pulse signal in response to incidence of light emitted from the biological particles (e.g., the cells 10a) as a result of the irradiation. The plurality of pixels Px is disposed in a matrix form on a light receiving surface (a pixel array section 32-1) of the imaging device 32. The flow cytometer 1 generates image data Id by performing a TDI process with use of a plurality of pulse signals obtained from a plurality of pixel lines of the plurality of pixels Px. The plurality of pixel lines is disposed to be aligned in a row direction. It is thereby possible to determine a kind, a size, a structure, etc. of the individual biological particles (e.g., the cells 10a).
The biological sample C may be a liquid sample including the cells 10a. The cells 10a each correspond to a specific example of a "biological particle" of the present disclosure. The cells 10a may be living cells. More specific examples of the cells 10a may include blood cells including red blood cells and white blood cells, and germ cells including sperm and fertilized eggs. The cells 10a may be non-cellular biological particles. The cells 10a may be directly collected from a specimen such as whole blood, or may be cultured cells acquired after culture. Specific examples of the non-cellular biological particles may include extracellular vesicles, and particularly, exosomes and microvesicles. The biological particles 10a may be labeled with one or more labeling agents (e.g., pigments (particularly, fluorochromes), fluorochrome-labeled antibodies, or the like). It is to be noted that the flow cytometer 1 according to the present disclosure may analyze particles other than the biological particles, or may analyze beads or the like for calibration or the like.
The flow channel 10 may be configured to allow the biological sample C to flow therethrough, and in particular, to form a flow in which the cells 10a included in the biological sample C are substantially in a line. A flow channel structure including the biological sample C may be designed to form a laminar flow. In particular, the flow channel structure is designed to form a laminar flow in which a flow of the biological sample C (a sample flow) is enclosed by a flow of a sheath liquid. The design of the flow channel structure may be appropriately selected by a person of ordinary skill in the art, and a known design may be employed. The flow channel 10 may be formed within a flow channel structure (Flow Channel Structure) such as a microchip (a chip having a flow channel of the order of micrometers) or a flow cell. A width of the flow channel 10 is 1 mm (millimeter) or less, and may be, in particular, 10 μm (micrometers) or more and 1 mm or less. The flow channel C and the flow channel structure including the flow channel C may include a material such as plastic or glass.
The apparatus of the present disclosure may be configured to cause the biological sample C flowing in the flow channel 10 and, in particular, the cells 10a in the biological sample C, to be irradiated with light L1 from a light irradiator 20. The apparatus of the present disclosure may be configured to allow an interrogation point (Interrogation Point) of the light L1 on the biological sample C to be inside the flow channel structure in which the flow channel 10 is formed, or may be configured to allow the interrogation point of the light L1 to be outside the flow channel structure. Examples of the former may include a configuration in which the flow channel 10 in the microchip or the flow cell is irradiated with the light L1. In the latter case, the cells 10a after exiting the flow channel structure (in particular, a nozzle portion thereof) may be irradiated with the light L1, and examples thereof may include a Jet-in-Air flow cytometer.

The flow cytometer 1 is an apparatus that acquires image data by imaging. The flow cytometer 1 includes, for example, the flow channel 10, the light irradiator 20, a detector 30, a scanning controller 40, and an image data processor 50, as illustrated in FIG. 1.

The light irradiator 20 irradiates a predetermined spot on the flow channel 10 with the light L1. The biological particles (the cells 10a) travel in the flow channel 10 to pass through the predetermined spot. The light irradiator 20 includes a light source section 21 that emits the light L1, and a condensing optical system 22 that guides the light L1 to the flow channel 10.

The light source section 21 includes one or more light sources. Examples of the kind of the light source may include a laser light source and an LED (Light Emitting Diode). Light emitted from each of the light sources may have a wavelength of any of ultraviolet light, visible light, and infrared light. The condensing optical system 22 includes an optical component such as a beam splitter group, a mirror group, or an optical fiber. Further, the condensing optical system 22 may include a lens group for condensing the light L1, and may include an objective lens, for example. The number of interrogation points of the light L1 on the biological sample C may be one or more. The light irradiator 20 may be configured to concentrate light emitted from one light source or a plurality of different light sources onto one interrogation point.

The detector 30 includes a photodetector (e.g., the imaging device 32) that detects light L2 generated as a result of irradiation of the cells 10a with light performed by the light irradiator 20. The detector 30 may further include an optical system (e.g., an objective lens 31) that guides the light L2 to the light receiving surface of the imaging device 32. The light L2 is, for example, fluorescence or scattered light (e.g., one or more of forward scattered light, back scattered light, and side scattered light), transmitted light, or reflected light. The imaging device 32 acquires the image data Id by imaging, and outputs the image data Id acquired by imaging to the image data processor 50. The imaging device 32 has the plurality of pixels Px on the light receiving surface. The plurality of pixels Px is two-dimensionally disposed on the light receiving surface.

The image data Id may include data allowing for construction of an image such as a bright-field image, a dark-field image, a fluorescent image, or the like, and may be used as optical data including fluorescence data and scattered light data.

The imaging device 32 includes a TDI sensor, and acquires the image data Id of high sensitivity and low noise. The imaging device 32 includes, for example, the pixel array section 32-1 in which the plurality of pixels Px is formed, and an image data generator 32-2, as illustrated in FIG. 2. In the imaging device 32, an imaging target object (e.g., the cell 10a) travels at a constant speed in a column direction (an up-down direction in the sheet plane) with respect to the pixel array section 32-1. The image data generator 32-2 acquires, for example, a sum of a plurality of pieces of pixel data obtained from a plurality of pixels Px (a column line) disposed to be aligned in the column direction, for each of the column lines. The image data generator 32-2 generates the image data Id on the basis of, for example, the sum of the plurality of pieces of pixel data acquired for each of the column lines, and outputs the image data Id to the image data processor.

FIG. 3 illustrates a circuit configuration example of the pixel Px. As illustrated in FIG. 3, for example, the pixel Px includes a light pulse responder 321 and a detector 322. The light pulse responder 321 generates a light pulse in response to incidence of light. The light pulse responder 321 includes, for example, a light receiving section 321b and a quench section 321a.

The light receiving section 321b includes an avalanche photodiode (APD). In the APD of a Geiger mode, when a voltage higher than or equal to a breakdown voltage is applied between terminals, an avalanche phenomenon occurs upon incidence of a single photon. The APD in which a single photon causes multiplication by the avalanche phenomenon is referred to as a single photon avalanche diode (SPAD). In each pixel Px, the light pulse responder 321 includes the SPAD, for example. The quench section 321a has a function of stopping (quenching) the avalanche phenomenon by reducing the voltage applied to the light receiving section 321b to the breakdown voltage. The quench section 321a further has a function of enabling detection of a photon again at the light receiving section 321b by causing the voltage applied to the light receiving section 321b to be a bias voltage higher than or equal to the breakdown voltage. The quench section 321a includes a MOS transistor, for example. The quench section 321a may be a resistor, for example.

One end of the quench section 321a (for example, a source of the MOS transistor) is coupled to a power supply line Vdd to which a fixed voltage VDD is applied. In contrast, another end of the quench section 321a (for example, a drain of the MOS transistor) is coupled to one end of the light receiving section 321b (for example, a cathode of the APD) via a signal line L1. Another end of the light receiving section 321b (for example, an anode of the APD) is coupled to a power supply line Vss to which a reference voltage Van is applied, for example. Values of the fixed voltage VDD and the reference voltage Van are set to cause a voltage higher than or equal to the breakdown voltage to be applied to the light receiving section 321b. The signal line L1 is coupled to the other end of the quench section 321a (for example, the drain of the MOS transistor) and the one end of the light receiving section 321b (for example, the cathode of the APD).

In each pixel Px, the detector 322 includes a counter section 322b and two switch sections 322a and 322c, for example.

One end of the switch section 322a is coupled to the signal line L1. Another end of the switch section 322a is coupled to an input end of the counter section 322b (an input end of an adder circuit to be described later). The switch section 322a controls coupling and decoupling between the signal line L1 and the input end of the counter section 322b. The counter section 322b is a digital counter of k bits (k≥1), for example. The digital counter is a digital circuit including a latch circuit and the like. The counter section 322b includes a circuit (a rewrite circuit) that rewrites an initial value on the basis of an input signal (a rewrite signal) from an external source, and a circuit (the adder circuit) that adds an input signal (an addition signal) from an external source to the initial value.

One end of the switch section 322c is coupled to an output end of the counter section 322b (an output end of the adder circuit). Another end of the switch section 322c is coupled to the input end of the counter section 322b (the input end of the rewrite circuit) of a pixel Px included in a row line of a next stage (a next row). The switch section 322c controls coupling and decoupling between the output end of the counter section 322b and the input end of the counter section 322b of the pixel Px in the subsequent stage. The counter section 322b outputs information held therein to the counter section 322b (the input end of the rewrite circuit) of the pixel Px included in the row line of the next stage. The counter section 322b writes information held therein on the counter section 322b of the pixel Px included in the row line of the next stage as the initial value.

The scanning controller 40 controls an operation of the imaging device 32. The scanning controller 40 includes a speed measurement section 41 and a signal generator 42, for example.

The speed measurement section 41 measures the speed (specifically, a relative speed with respect to the speed measurement section 41) of the cells 10a flowing in the biological flow channel 10. Any of various detection methods allowing for detection of the speed of the cells 10a, including an electrostatic method and an optical method, may be employed for the speed measurement section 41. The speed measurement section 41 outputs data Sa about the detected speed of the cells 10a to the signal generator 42 as needed. The signal generator 42 determines the line rate of the imaging device 32 on the basis of the data Sa inputted from the speed measurement section 41. The signal generator 42 generates a control signal Sb (e.g., control signals φ1 and φ2) corresponding to the determined line rate, and outputs the control signal Sb to the imaging device 32.

The image data processor 50 executes processing of various kinds of data including the image data Id. The image data Id may include data allowing for construction of an image such as a bright-field image, a dark-field image, a fluorescent image, or the like, and may be used as optical data including fluorescence data and scattered light data. The image data processor 50 may execute correction to cancel out rotations of the biological particles (the cells 10a) traveling in the flow channel 10. On the basis of the image data Id acquired by the imaging device 32, the image data processor 50 is further able to generate an image such as the bright-field image, the dark-field image, the fluorescent image, or the like of the biological particles (the cells 10a), and may also acquire a feature quantity such as the shape, the size, the color, or the like of the biological particles (the cells 10a), attribute information indicative of normality/abnormality or the like, etc. The image data processor 50 is also able to process the image data Id as optical data. In this case, the image data processor 50 is able to acquire light intensity data (which may include a feature quantity such as Area, Height, Width, or the like) from the optical data.

The image data processor 50 may include a storage configured to hold the image data Id. In the image data processor 50, the storage may be configured to further hold the image such as the bright-field image, the dark-field image, the fluorescent image, or the like of the biological particles (the cells 10a), the feature quantity such as shape, the size, the color, or the like of the biological particles (the cells 10a), attribute information indicative of normality/abnormality or the like, the light intensity data, etc. that are acquired from the image data Id.

In a case where the flow cytometer 1 includes a sorting section to be described later, the image data processor 50 may execute a determination, on the basis of the image data, the image or the feature quantity acquired from the image data, and the light intensity data acquired therefrom, as to whether or not the biological particles (the cells 10a) are to be sorted. Thereafter, the image data processor 50 may control the sorting section on the basis of a result of the determination, and sorting of the biological particles (the cells 10a) by the sorting section may be performed. Further, whether to perform the sorting may be determined by a trained model constructed with use of a technique of machine learning such as a neural network. It is possible to construct the trained model by, for example, using a correspondence between image data acquired in advance and gating information as a teacher.

The image data processor 50 may be configured to output various kinds of data (e.g., the image data Id, the image or the feature quantity acquired from the image data Id, and the light intensity data acquired therefrom). For example, the image data processor 50 may output various kinds of data (e.g., a two-dimensional plot and the like) generated on the basis of the image data Id, the image or the feature quantity acquired from the image data Id, and the light intensity data acquired therefrom. Here, the image data processor 50 is also able to perform clustering or a dimensional compression process on the image data Id, the image or the feature quantity acquired from the image data Id, or the light intensity data acquired therefrom for visualization and outputting as two-dimensional or three-dimensional graphs. Further, the image data processor 50 may be configured to accept input of various kinds of data, and accepts, for example, a gating process performed by a user on a plot. The image data processor 50 may include an output section (e.g., a display) or an input section (e.g., a keyboard) allowing for execution of the input or the output.

The image data processor 50 may be configured as a general-purpose computer, and may be configured as, for example, an information processor including a CPU (Central Processing Unit), a RAM (Random Access Memory), and a ROM (Read only memory). The image data processor 50 may be contained inside a housing in which the light irradiator 20 and the detector 30 are provided, or may be outside the housing. Further, various kinds of processing or functions to be performed by the image data processor 50 may be implemented by a server computer or the cloud coupled via a network.

The sorting section may execute sorting of the biological particles (the cells 10a) on the basis of the result of determination by the image data processor 50, for example. A method of sorting may be a method including generating droplets containing the biological particles (the cells 10a) by vibration, applying electric charge to the droplet to be sorted, and controlling a traveling direction of the droplet by means of an electrode. The method of sorting may be a method in which sorting is performed by controlling the traveling direction of the biological particles (the cells 10a) in the flow channel structure. The flow channel structure is provided with, for example, a control mechanism that uses pressure (injection or suction) or electric charge. Examples of the flow channel structure may include a chip (for example, a chip described in Japanese Unexamined Patent Application Publication No. 2020-76736) in which the flow channel 10 has a flow channel structure where the flow channel 10 branches to a recovery flow channel and a waste liquid flow channel on a downstream side thereof and in which specific biological particles (cells 10a) are recovered into the recovery flow channel.

[Operation]

Next, a description will be given of the operation of the imaging device 32. FIG. 4 is a timing chart illustrating an example of a method of controlling the imaging device 32. The scanning controller 40 turns on the switch section 322a of each pixel Px by setting the control signal φ1 to High. Photons are thus inputted to the counter section 322b from the light receiving section 321b where the avalanche phenomenon occurs. Thereafter, upon a lapse of a predetermined exposure period, the scanning controller 40 turns off the switch section 322a of each pixel Px by setting the control signal φ1 to low. The input of the photons from the light receiving section 11b to the counter section 12b is thus stopped. At this time, at the counter section 321b, information corresponding to the number of the inputted photons is added to the initial value, and information (held information) thereby obtained is held.

Thereafter, the scanning controller 40 turns on the switch section 322c of each pixel Px by setting the control signal φ2 to High. The counter section 322b thus outputs the information (the held information) held in the counter section 322b to the counter section 322b of a pixel Px included in a row line of a next stage (a next row) via the switch section 322c. The counter section 322b holds the information (the held information) inputted from the counter section 322b included in a row line of a preceding stage (a preceding row) as the initial value. In such a manner, pixel data of the row line of the preceding stage is transferred to the row line of the next stage, and the pixel data of the row line of the preceding stage and pixel data of the row line of the next stage are added together. The scanning controller 40 executes this repeatedly to thereby cause the sum of the plurality of pieces of pixel data, for each of the column lines, obtained from the plurality of pixels Px (the column line) disposed to be aligned in the column direction, to be inputted to the image data generator 32-2.

[Effects]

Next, a description will be given of effects of the flow cytometer 1.

In recent years, an imaging flow cytometer based on the TDI-CCD method has been developed that transfers the exposure value of the CCD to an adjacent line in synchronization with the speed of cells and performs integration (for example, see Patent Literature 1). However, according to this method, the line rate is determined by the AD conversion time or the CDS process time, and the upper limit of the line rate is thus limited to about several 100 kHz. Accordingly, in the TDI-CCD method, it is necessary to reduce the speed of the cells flowing in the flow channel, which leads to a limitation to the number of samples observable per unit time. This results in prolongation of the analysis time.

In contrast, according to the present embodiment, when the light L2 emitted from the cells 10a in the biological sample C as a result of irradiation of the cells 10a with the light L1 is incident on the plurality of pixels Px disposed in the matrix form, the pulse signal corresponding to the incidence is generated. It is thus possible to obtain a digital signal corresponding to the incidence of the light without using an AD converter. Further, according to the present embodiment, the TDI process is performed with use of a plurality of pulse signals obtained from the plurality of sets of pixel lines of the plurality of pixels Px, the plurality of sets of pixel lines being disposed to be aligned in the row direction. In this way, according to the present embodiment, it is possible to perform the TDI process without performing any AD conversion process. Further, the image data Id obtained in such a manner is low-noise data, and therefore it is not necessary to perform any CDS process. Accordingly, it is possible to raise the upper limit of the line rate, as compared with the existing method that uses an AD converter. By virtue of the foregoing, it is possible to improve analysis accuracy while suppressing prolongation of the analysis time.

2. Modification Examples

Next, a description will be given of modification examples of the flow cytometer 1 according to the foregoing embodiment.

Modification Example A

FIG. 5 illustrates a modification example of the functional blocks of the flow cytometer 1. In the foregoing embodiment, the detector 30 may include, for example, a spectroscopic optical system 33 that disperses the light emitted from the biological particles (the cells 10a), as illustrated in FIG. 5. The spectroscopic optical system 33 corresponds to a specific example of a "spectroscopic optical system" of the present disclosure. In the present modification example, the biological particles (the cells 10a) may be labeled with one or more fluorochromes. In this case, the light source section 21 may irradiate the biological particles (the cells 10a) with the light L1 including excitation light in one or more wavelength ranges.

The spectroscopic optical system 33 is disposed between the objective lens 31 and the imaging device 32, for example. The spectroscopic optical system 33 separates (disperses) the light emitted from the cells 10a by wavelength range in the row direction of the light receiving surface (the plurality of pixels Px) of the imaging device 32. The spectroscopic optical system 33 changes optical paths of reflected light, transmitted light, scattered light, and/or fluorescence from the biological particles (the cells 10a) in accordance with the wavelength range thereof to thereby spatially separates the light emitted from the biological particles (the cells 10a) by wavelength range (see FIG. 6). The spectroscopic optical system 33 causes pieces of light (e.g., pieces of dispersed light La, Lb, and Lc) in respective wavelength ranges obtained by dispersion to form images at locations different from each other on the light receiving surface (the plurality of pixels Px) of the imaging device 32 (see FIG. 6). The pieces of dispersed light La, Lb, and Lc form a plurality of biological particle images that are different in wavelength range from each other on the light receiving surface (the plurality of pixels Px) of the imaging device 32.

The imaging device 32 detects respective changes in luminance of the pieces of dispersed light La, Lb, and Lc obtained by dispersion at the spectroscopic optical system 33. The imaging device 32 receives, at mutually different regions of the light receiving surface (the plurality of pixels Px) of the imaging device 32, the pieces of dispersed light La, Lb, and Lc obtained by dispersion at the spectroscopic optical system 33, and acquires image data IdA including the plurality of biological particle images that are different in wavelength range from each other. In this case, the plurality of pixels Px is disposed in a one-to-one relationship with the respective pieces of dispersed light La, Lb, and Lc resulting from the dispersion by the spectroscopic optical system 33. This makes it possible for information about the biological particles (the cells 10a) to be multicolored. In addition, by virtue of the multicolored information, it is possible to construct a biological particle image in which, for example, the bright-field image of the biological particles (the cells 10a) resulting from the reflected light or the dark-field image thereof resulting from the transmitted light and the fluorescent image thereof corresponding to a plurality of fluoro-chromes are superimposed on each other, which allows for a higher-order analysis of the biological particles (the cells 10*a*).

It is to be noted that, as illustrated in FIGS. 7 and 8, for example, the imaging device 32 may include a plurality of imaging devices 32A, 32B, and 32C assigned to the respective pieces of dispersed light La, Lb, and Lc. The imaging device 32A receives the dispersed light La and outputs image data Ida obtained thereby to the image data processor 50. The imaging device 32B receives the dispersed light Lb and outputs image data Idb obtained thereby to the image data processor 50. The imaging device 32C receives the dispersed light Lc and outputs image data Idc obtained thereby to the image data processor 50. In a case where such a configuration is employed also, it is possible for the information about the biological particles (the cells 10*a*) to be multicolored.

Modification Example B

FIG. 9 illustrates a modification example of the functional blocks of the flow cytometer 1. In the foregoing embodiment, the detector 30 may include, for example, an expansion optical system 34 and a plurality of spectroscopic optical systems (e.g., spectroscopic optical systems 33A, 33B, and 33C), as illustrated in FIG. 9. The spectroscopic optical systems 33A, 33B, and 33C each correspond to a specific example of the "spectroscopic optical system" of the present disclosure. FIG. 9 illustrates an example case where three spectroscopic optical systems are provided; however, two spectroscopic optical systems may be provided, or four or more spectroscopic optical systems may be provided.

The expansion optical system 34 expands light Lb obtained via the objective lens 31 and guides it to a predetermined region including the plurality of spectroscopic optical systems (e.g., the spectroscopic optical systems 33A, 33B, and 33C). It is to be noted that the expansion optical system 34 may be omitted in a case where the predetermined region including the plurality of spectroscopic optical systems (e.g., the spectroscopic optical systems 33A, 33B, and 33C) has a size equal to a size of a region to be irradiated with the light Lb obtained via the objective lens 31.

The spectroscopic optical systems 33A, 33B, and 33C are disposed to be aligned between the objective lens 31 and the imaging device 32, for example, in the column direction of the light receiving surface (the plurality of pixels Px) of the imaging device 32. The spectroscopic optical systems 33A, 33B, and 33C each separate (disperse) the light Lb emitted from the cells 10*a* by wavelength range in the column direction of the light receiving surface (the plurality of pixels Px) of the imaging device 32. The spectroscopic optical systems 33A, 33B, and 33C each change the optical paths of the reflected light, the transmitted light, the scattered light, and/or the fluorescence from the biological particles (the cells 10*a*) in accordance with the wavelength range thereof to thereby spatially separate the light emitted from the biological particles (the cells 10*a*) by wavelength range (see FIG. 9). The spectroscopic optical systems 33A, 33B, and 33C each cause, among the pieces of light (e.g., the pieces of dispersed light La, Lb, and Lc) in respective wavelength ranges obtained by dispersion, a plurality of pieces of dispersed light La, Lb, and Lc (biological particle images) different from each other in wavelength range to form images sequentially (on a time-division basis) at a common location on the light receiving surface (the plurality of pixels Px) of the imaging device 32 (see FIGS. 9 and 10).

The imaging device 32 receives the pieces of dispersed light La, Lb, and Lc, which have been obtained by dispersion at the spectroscopic optical systems 33A, 33B, and 33C, sequentially (on a time-division basis) in a common region of the light receiving surface (the plurality of pixels Px) of the imaging device 32. The imaging device 32 thereby acquires a plurality of pieces of image data Id in which wavelength bands of the biological particle images included therein are different from each other. This makes it possible for the information about the biological particles (the cells 10*a*) to be multicolored. In addition, by virtue of the multicolored information, it is possible to construct a biological particle image in which, for example, the bright-field image of the biological particles (the cells 10*a*) resulting from the reflected light or the dark-field image thereof resulting from the transmitted light and the fluorescent image thereof corresponding to a plurality of fluorochromes are superimposed on each other, which allows for a higher-order analysis of the biological particles (the cells 10*a*).

Modification Example C

The image data processor 50 according to the embodiment and the modification examples thereof described hereinabove may be implemented by a computer 1000 having a configuration illustrated in FIG. 11, for example. FIG. 11 is a hardware configuration diagram illustrating an example of the computer 1000 that implements the functions of the image data processor 50. The computer 1000 includes a CPU 1100, a RAM 1200, a ROM (Read Only Memory) 1300, an HDD (Hard Disk Drive) 1400, a communication interface 1500, and an input/output interface 1600. The components of the computer 1000 are coupled to each other through a bus 1050.

The CPU 1100 operates on the basis of a program stored in the ROM 1300 or the HDD 1400, and controls each component. For example, the CPU 1100 expands programs stored in the ROM 1300 or the HDD 1400 on the RAM 1200, and executes processing corresponding to each kind of program.

The ROM 1300 holds a boot program such as BIOS (Basic Input Output System) to be executed by the CPU 1100 upon startup of the computer 1000, a program dependent on hardware of the computer 1000, and the like.

The HDD 1400 is a computer-readable recording medium that non-transitorily records a program to be executed by the CPU 1100, data to be used by such a program, and the like. Specifically, the HDD 1400 is a recording medium that records a program, which is one example of program data 1450, to be used for implementing various operations according to the present disclosure.

The communication interface 1500 is an interface that allows for coupling of the computer 1000 to an external network 1550 (e.g., the Internet). For example, the CPU 1100 receives data from any other equipment or transmits data generated by the CPU 1100 to any other equipment through the communication interface 1500.

The input/output interface 1600 is an interface for coupling an input/output device 1650 and the computer 1000 to each other. For example, the CPU 1100 receives data from an input device such as a keyboard or a mouse through the input/output interface 1600. In addition, the CPU 1100 transmits data to an output device such as a display, a speaker, or a printer through the input/output interface 1600. In addition, the input/output interface 1600 may function as a media interface that reads a program or the like recorded on a predetermined recording medium (media). Examples of the media include optical recording media including a DVD (Digital Versatile Disc) and a PD (Phase change rewritable Disk), magneto-optical recording media including an MO (Magneto-Optical disk), tape media, magnetic recording media, semiconductor memories, and the like.

For example, in a case where the computer 1000 functions as the image data processor 50 according to the foregoing embodiment, the CPU 1100 of the computer 1000 implements the functions of the image data processor 50 by executing the program loaded on the RAM 1200. In addition, the program and the like according to the present disclosure are stored in the HDD 1400. It is to be noted that the CPU 1100 reads the program data 1450 from the HDD 1400 for execution; however, as another example, the CPU 1100 may acquire these programs from any other apparatus through the external network 1550.

Although the present disclosure has been described hereinabove with reference to the embodiment and the modification examples, the present disclosure is not limited to the foregoing embodiment and the like, and may be modified in a variety of ways. It is to be noted that the effects described here are mere examples. The effects of the present disclosure are not limited to the effects described herein. The present disclosure may have effects other than the effects described herein.

In addition, for example, the present disclosure may have the following configurations.

(1)

A biological sample analysis system including:

an irradiator that irradiates a biological particle in a biological sample with light;

a plurality of pixels disposed in a matrix form, each of the plurality of pixels generating a pulse signal in response to incidence of light emitted from the biological particle as a result of irradiation with the light; and a processor that performs a TDI (Time Delay Integration) process with use of a plurality of the pulse signals and that processes image data obtained thereby, the plurality of pulse signals being obtained from a plurality of sets of pixel lines of the plurality of pixels, the plurality of sets of pixel lines being disposed to be aligned in a row direction.

(2)

The biological sample analysis system according to (1), in which the biological particle includes a cell or a non-cellular biological particle.

(3)

The biological sample analysis system according to (1) or (2), in which the irradiator irradiates a predetermined spot on a flow channel with the light, and the biological particle travels in the flow channel to pass through the predetermined spot.

(4)

The biological sample analysis system according to any one of (1) to (3), further including a spectroscopic optical system that disperses the light emitted from the biological particle, in which the biological particle is labeled with one or more fluorochromes, the irradiator irradiates the biological particle with the light including excitation light in one or more wavelength ranges, and the plurality of pixels generates the respective pulse signals in accordance with pieces of light resulting from dispersion by the spectroscopic optical system.

(5)

The biological sample analysis system according to (4), in which the plurality of pixels is disposed in a one-to-one relationship with the respective pieces of light resulting from the dispersion by the spectroscopic optical system.

(6)

The biological sample analysis system according to (4), in which the plurality of pixels is disposed to allow the pieces of light resulting from the dispersion by the spectroscopic optical system to form images sequentially.

(7)

The biological sample analysis system according to (6), further including an expansion optical system that expands the light emitted from the biological particle, in which the spectroscopic optical system causes the light expanded by the expansion optical system to form images on the plurality of pixels sequentially.

(8)

The biological sample analysis system according to any one of (1) to (7), further including a speed measurement section that detects a speed of the biological particle in the flow channel, in which the generator generates the image data from the plurality of pulse signals on the basis of data related to the speed detected by the speed measurement section.

(9)

An information processor including a generator that generates image data by performing a TDI (Time Delay Integration) process with use of a plurality of pulse signals obtained from a plurality of sets of pixel lines of a plurality of pixels disposed in a matrix form, the plurality of sets of pixel lines being disposed to be aligned in a row direction, each of the plurality of pixels generating the pulse signal in response to incidence of light emitted from a biological particle in a biological sample as a result of irradiation of the biological particle with light.

(10)

An information processing method including generating image data by performing a TDI (Time Delay Integration) process with use of a plurality of pulse signals obtained from a plurality of sets of pixel lines of a plurality of pixels disposed in a matrix form, the plurality of sets of pixel lines being disposed to be aligned in a row direction, each of the plurality of pixels generating the pulse signal in response to incidence of light emitted from a biological particle in a biological sample as a result of irradiation of the biological particle with light.

(11)

A biological sample analysis method including:

irradiating a biological particle in a biological sample with light; and generating image data by performing a TDI (Time Delay Integration) process with use of a plurality of pulse signals obtained from a plurality of sets of pixel lines of a plurality of pixels disposed in a matrix form, the plurality of sets of pixel lines being disposed to be aligned in a row direction, each of the plurality of pixels generating the pulse signal in response to incidence of light emitted from the biological particle as a result of irradiation with the light.

According to the biological sample analysis system, the information processor, the information processing method, and the biological sample analysis method of an embodiment of the present disclosure, when light emitted from a biological particle in a biological sample as a result of irradiation of the biological particle with light is incident on a plurality of pixels disposed in a matrix form, a pulse signal corresponding to the incidence is generated. It is thus possible to obtain a digital signal corresponding to the incidence of light without using an AD converter. Further, according to the present disclosure, the TDI process is performed with use of a plurality of pulse signals obtained from a plurality of sets of pixel lines of the plurality of pixels, the plurality of sets of pixel lines being disposed to be aligned in the row direction. In this way, according to the present disclosure, it is possible to perform the TDI process without performing any AD conversion process. Further, image data obtained in such a manner is low-noise data, and therefore it is not necessary to perform any CDS process. Accordingly, it is possible to raise the upper limit of the line rate as compared with the existing method that uses an AD converter. By virtue of the foregoing, it is possible to improve analysis accuracy while suppressing prolongation of the analysis time. It is to be noted that the effects of the present disclosure are not necessarily limited to the effects described here and may include any of the effects described herein.

This application claims the benefit of Japanese Priority Patent Application JP2021-110227 filed with the Japan Patent Office on Jul. 1, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A biological sample analysis system comprising:
an irradiator that irradiates a biological particle in a biological sample with light;
a plurality of pixels disposed in a matrix form, each of the plurality of pixels generating a pulse signal in response to incidence of light emitted from the biological particle as a result of irradiation with the light wherein, each pixel in the plurality of pixels comprises a counter section and two switch sections; and
a generator that generates image data by performing a TDI (Time Delay Integration) process with use of a plurality of the pulse signals obtained from a plurality of sets of pixel lines of the plurality of pixels, the plurality of sets of pixel lines being disposed to be aligned in a row direction.

2. The biological sample analysis system according to claim 1, wherein the biological particle comprises a cell or a non-cellular biological particle.

3. The biological sample analysis system according to claim 1, wherein
the irradiator irradiates a predetermined spot on a flow channel with the light, and
the biological particle travels in the flow channel to pass through the predetermined spot.

4. The biological sample analysis system according to claim 1, further comprising a spectroscopic optical system that disperses the light emitted from the biological particle by wavelength range in the row direction of the plurality of pixels, wherein
the biological particle is labeled with one or more fluorochromes,
the irradiator irradiates the biological particle with the light including excitation light in one or more wavelength ranges, and the plurality of pixels generates the respective pulse signals in accordance with pieces of light resulting from dispersion by the spectroscopic optical system.

5. The biological sample analysis system according to claim 4, wherein the plurality of pixels is disposed in a one-to-one relationship with the respective pieces of light resulting from the dispersion by the spectroscopic optical system.

6. The biological sample analysis system according to claim 4, wherein the plurality of pixels is disposed to allow the pieces of light resulting from the dispersion by the spectroscopic optical system to form images sequentially.

7. The biological sample analysis system according to claim 6, further comprising an expansion optical system that expands the light emitted from the biological particle and guides the light to a predetermined region, wherein
the spectroscopic optical system causes the light expanded by the expansion optical system to form images on the plurality of pixels sequentially.

8. The biological sample analysis system according to claim 1, further comprising a speed measurement section that detects a speed of the biological particle in a flow channel, wherein
the generator generates the image data from the plurality of pulse signals on a basis of data related to the speed detected by the speed measurement section and
the speed measurement section uses at least one of an electrostatic method and an optical method.

9. The biological sample analysis system of claim 1, wherein
the counter section is a digital counter of k bits.

10. The biological sample analysis system of claim 1, wherein
the counter section includes a rewrite circuit that rewrites an initial value on the basis of a rewrite signal from an external source, and an adder circuit that adds a input signal from an external source to the initial value.

11. An information processor comprising
a generator that generates image data by performing a TDI (Time Delay Integration) process with use of a plurality of pulse signals obtained from a plurality of sets of pixel lines of a plurality of pixels disposed in a matrix form, the plurality of sets of pixel lines being disposed to be aligned in a row direction, each of the plurality of pixels generating the pulse signal in response to incidence of light emitted from a biological particle in a biological sample as a result of irradiation of the biological particle with light.

12. An information processing method comprising
generating image data by performing a TDI (Time Delay Integration) process with use of a plurality of pulse signals obtained from a plurality of sets of pixel lines of a plurality of pixels disposed in a matrix form wherein,
each pixel in the plurality of pixels comprises a counter section and two switch sections, and
the plurality of sets of pixel lines being disposed to be aligned in a row direction, each of the plurality of pixels generating the pulse signal in response to incidence of light emitted from a biological particle in a biological sample as a result of irradiation of the biological particle with light.

13. A biological sample analysis method comprising:
irradiating a biological particle in a biological sample with light; and
generating image data by performing a TDI (Time Delay Integration) process with use of a plurality of pulse signals obtained from a plurality of sets of pixel lines of a plurality of pixels disposed in a matrix form wherein, each pixel in the plurality of pixels comprises a counter section and two switch sections, and the plurality of sets of pixel lines being disposed to be aligned in a row direction, each of the plurality of pixels generating the pulse signal in response to incidence of light emitted from the biological particle as a result of irradiation with the light.

*    *    *    *    *